United States Patent [19]

Dodson et al.

[11] Patent Number: 4,466,834
[45] Date of Patent: Aug. 21, 1984

[54] CORROSION INHIBITING ADDITIVE FOR CEMENT COMPOSITIONS

[75] Inventors: Vance H. Dodson, Arlington; Thomas D. Hayden, Winchester, both of Mass.

[73] Assignee: W. R. Grace & Co., Cambridge, Mass.

[21] Appl. No.: 455,352

[22] Filed: Jan. 3, 1983

[51] Int. Cl.³ .................... C04B 7/35; C04B 7/352
[52] U.S. Cl. .................................. 106/89; 106/90; 106/92; 106/314; 106/315
[58] Field of Search .............. 106/314, 315, 89, 90, 106/92

[56] References Cited

U.S. PATENT DOCUMENTS 4,092,109 5/1978 Rosenberg et al. ............ 106/315
4,285,733 8/1981 Rosenberg ..................... 106/98
4,318,744 3/1982 Dodson ......................... 106/315

FOREIGN PATENT DOCUMENTS 5224529 2/1975 Japan ............................ 106/314

*Primary Examiner*—James Poer
*Attorney, Agent, or Firm*—John J. Wasatonic; William L. Baker

[57] ABSTRACT

Additive compositions for Portland cement compositions are disclosed which provide the corrosion inhibition of calcium nitrite without the corresponding set acceleration. The additive compositions are stable, single phase aqueous solutions consisting essentially of water and, as solutes, a major amount by weight of calcium nitrite and a minor amount by weight of corn syrup, a hydroxycarboxylic acid, or an alkali metal or alkaline earth metal salt of a hydroxycarboxylic acid.

12 Claims, No Drawings

CORROSION INHIBITING ADDITIVE FOR CEMENT COMPOSITIONS

BACKGROUND OF THE INVENTION

This invention relates to additives for cement compositions. More particularly, this invention relates to corrosion inhibiting additives for Portland cements which combine a corrosion inhibitor with a set retarder and to the use of said additives in inhibiting the corrosion of metal in contact with the cement.

Calcium nitrite is well known as a corrosion inhibiting additive for Portland cements. U.S. Pat. No. 3,427,175, for example, relates to Portland cement compositions containing from about 0.1 to 10 percent calcium nitrite based on the dry weight of Portland cement and discloses that calcium nitrite inhibits corrosion of iron and steel reinforcing structures in the cement. While other nitrites, e.g., sodium nitrite, can be used to inhibit corrosion, calcium nitrite is preferred inasmuch as it provides effective corrosion inhibition without many of the disadvantages encountered with other nitrites, such as reduction in compressive strength or efflorescence on brick work.

When calcium nitrite is used in Portland cement compositions in the concentrations generally necessary to achieve substantial corrosion inhibition, e.g., greater than 0.5% by weight of calcium nitrite, based on the weight of dry cement, it normally also provides a substantial level of set acceleration. While this may be advantageous in certain applications, the set acceleration provided by a corrosion inhibiting amount of calcium nitrite can result in too rapid a setting of the cement composition. Particularly in warm weather applications, the set acceleration resulting from calcium nitrite addition can be an acute problem, resulting in extremely short setting times and, thus, severely foreshortening the time allowed for preparation, transport, working, etc., of the cement composition.

The severity of the set acceleration by corrosion inhibiting concentrations of calcium nitrite has heretofore been lessened by separately adding to the cement composition a set retarding agent which is capable of offsetting the set acceleration and extending the plastic life of the cement. However, this practice requires the cement producer or user to purchase, store, and dispense two additives, with added inconvenience, labor, and cost. Moreover, the need for a second additive is undesirable in that it increases the opportunity for error or miscalculation in dispensing the proper respective amounts of the additives.

SUMMARY OF THE INVENTION

This invention relates to corrosion inhibiting additive compositions for Portland cement compositions which provide the corrosion inhibition of calcium nitrite without the corresponding set acceleration. In its product aspects, the present invention is directed to corrosion inhibiting additive compositions for Portland cement compositions, the additive compositions being aqueous solutions consisting essentially of water and, as solutes, a major amount by weight of calcium nitrite and a minor amount by weight of corn syrup, a hydroxycarboxylic acid, or an alkali metal or alkaline earth metal salt of a hydroxycarboxylic acid. The additive compositions of this invention are stable, homogeneous, single phase aqueous solutions which can be stored for extended periods of time without substantial change in effectiveness, chemical properties, or physical state.

In its method aspects, this invention is directed to a method for inhibiting corrosion of metal in contact with Portland cement compositions. The method comprises the step of adding to a Portland cement composition prior to setting an effective amount of a corrosion inhibiting additive composition of this invention.

DETAILED DESCRIPTION OF THE INVENTION

In accordance with the present invention, it has been found that major amounts of calcium nitrite can be solubilized in water with minor amounts of certain set retarding agents to provide a stable, single phase, homogeneous solution which can be used as an effective corrosion inhibiting additive for Portland cements. Specifically, it has been found that major amounts of calcium nitrite can be solubilized in water with minor amounts of corn syrup, a hydroxycarboxylic acid, or an alkali metal or alkaline earth metal salt of a hydroxycarboxylic acid to provide homogeneous, single phase solutions having an extended shelf life. These solutions can be added to Portland cement compositions to provide corrosion inhibition without the accompanying set acceleration which would normally occur with the use of a corresponding amount of calcium nitrite alone, thus eliminating the need for addition of a separate set retarding additive.

As aforementioned, the additive compositions of this invention are stable, single phase, homogeneous aqueous solutions. Reference to the stability of the solutions herein is intended to denote the chemical inertness of the solute components thereof, i.e., the solubilized calcium nitrite is substantially chemically inert to water-solubilized corn syrup, hydroxycarboxylic acids, and alkali metal and alkaline earth metal salts thereof for extended periods of time at ordinary storage temperatures, and also the physical stability of the solutions, i.e. the solutions remain as single phase, homogeneous solutions without formation of precipitates, coagulants, etc. The chemical inertness of the solutes is of course important for retaining the effectiveness of the composition during storage and preventing the formation of undesired reaction products, e.g., reaction products which are deleterious to the performance of the additive in a cement composition. The physical stability of the solutions is also important for purposes of storage. Agitation or mixing prior to use is obviated and the single phase, homogeneous nature of the solution facilitates addition of the respective solutes to cement in proper amount and at a desired ratio.

The corn syrups, hydroxycarboxylic acids and alkali metal and alkaline earth metal salts of hydroxycarboxylic acids which are used in the products and process of this invention are hereinafter referred to generally as set retarders, consistent with their function of at least partially offsetting the set accelerating effects of corrosion inhibiting concentrations of calcium nitrite in Portland cement compositions. However, consistent with the product aspects of this invention, these materials should also be viewed as water solutes which have been found to be compatible with water-solubilized calcium nitrite, such that the stable, single phase solutions of this invention can be prepared.

The compositions of this invention are aqueous solutions which consist essentially of water and, as solutes, calcium nitrite and one or more of the aforementioned set retarders. Accordingly, the compositions of this invention do not include any cosolvents or additional solutes which would alter the novel or basic characteristics of the solution. The compositions of this invention do not include, for example, any solutes which are chemically reactive with calcium nitrite or the set retarder of choice to cause phase separation or the formation of precipitates, coagulants, and the like, thus impairing the functioning or stability of the solutions. Similarly, although water-miscible cosolvents may be employed herein, e.g., the lower molecular weight alcohols, the present compositions are not inclusive of cosolvents which adversely effect the stability or function of the solution.

The concentration of calcium nitrite in the solutions of this invention can vary over a wide range, up to the limits of water solubility at ordinary storage temperatures, but preferably is in the range of about 10% to 40%, on a weight basis, and most preferably about 25% to 35%.

The set retarder is present in the solutions of this invention in a minor amount, on a weight basis, as compared to the amount of calcium nitrite. Within this limitation, the amount of set retarder will vary depending on the properties of the particular material, e.g., molecular weight, water solubility, and efficiency in offsetting the set accelerating effects of calcium nitrite, and will also vary depending on the degree to which it is desired to offset the set acceleration of calcium nitrite. It should be recognized that the additive solution may contain sufficient set retarder to partially or completely offset the set accelerating effects of the calcium nitrite or to achieve a net increase in set time as compared to that of a similar cement composition without the additive present.

In general, a weight ratio of calcium nitrite to set retarder (solute weight ratio) in the range of about 50:1 to 5:1 can be used to provide solutions which display good physical stability and provide desired set times, i.e., desired degrees of offsetting the set acceleration of calcium nitrite in typical Portland cement compositions. For a particular calcium nitrite concentration and set retarder, suitable or preferred solute weight ratios can be determined empirically.

The term "corn syrup" is used herein in its ordinary and well known sense and accordingly refers to any of the syrupy liquids comprising a mixture of glucose, maltose, and maltodextrins and obtained by partial hydrolysis of corn starch. They may be referred to in the alternative as glucose syrups.

As used herein, "hydroxycarboxylic acid" refers to primary aliphatic carboxylic acids having one or methylene groups substituted with one or two hydroxy groups. Included within this class of materials are 2-hydroxypropionic acid, 3-hydroxypropionic acid, 2-hyroxybutanoic acid, 3-hydroxybutanoic acid, 4-hydroxybutanoic acid, arabinaric acid, glucaric acid, and tartaric acid. Preferred hydroxycarboxylic acids are the glyconic acids conforming to formula (I)

$$\text{HO}-\text{CH}_2-(\text{CH})_n-\text{COOH}, \quad (I)$$

wherein n is 0 to 10, inclusive of all isomeric configurations. Glyconic acids conforming to formula (I) are well known in the field of carbohydrate chemistry and include arabonic acid, allonic acid, xylonic acid, gluconic acid, glucoheptonic acid, mannonic acid, and galactonic acid.

The present invention includes the use of alkali metal and alkaline earth metal salts of hydroxycarboxylic acids. While any alkali metal or alkaline earth metal can be used as the cation, sodium is the preferred alkali metal and calcium is the preferred alkaline earth metal. The preferred set retarders of this invention are the sodium salts of the glyconic acids of formula (I), particularly sodium gluconate and sodium heptogluconate.

The solutions of this invention are generally prepared by adding the respective solutes to water at room temperature at the desired concentration and stirring until a single phase solution is obtained. Heat may be applied to aid solubilization. As an alternative procedure, separate aqueous solutions of the respective solutes may be mixed to provide the desired solution.

It will be appreciated that the solutions of this invention can be prepared in a "concentrated" form for purposes of sale and storage and then diluted with water prior to use.

In accordance with the method aspects of this invention, the calcium nitrite-set retarder solutions hereof can be used to provide a corrosion inhibition function in Portland cement compositions. The method of this invention is accordingly a method for inhibiting the corrosion of metals in contact with the Portland cement composition, the method comprising adding to a Portland cement composition an effective amount of an additive solution of this invention. When added in effective amount, the additive solutions of this invention, specifically the calcium nitrite component thereof, inhibits the corrosion of metals in contact with the cement, generally to a degree equal to that obtained by use of a corresponding amount of calcium nitrite alone. Corrosion inhibition of iron and steel reinforcing bars embedded in the cement is an especially important function of the corrosion inhibitor, particularly where the cement or concrete structure is exposed to chloride ions, e.g., where road salt is applied for snow and ice removal and at coastal installations.

The term "Portland cement composition" is used herein in reference to any cement paste, concrete, including concretes containing fly ash or slag or other pozzolans, mortar, grout or other wet or dry cementitious composition in which Portland cement is used as a binding agent, including but not limited to Portland cement compositions of ASTM Types I through V. "Portland cement" is a familiar term of art which refers to those products produced by heating a mixture of limestone and clay or shale, or other calcareous or argillaceous materials to a fused state to produce a clinker and intergrinding the clinker with a few percent, normally about 4 to 6 percent, of a retarder such as gypsum.

Effective amounts of the additive compositions for providing generally acceptable levels of corrosion inhibition are those amounts which provide a weight concentration of calcium nitrite in the range of about 0.5% to 10.0%, based on the weight of dry Portland cement. A preferred range is about 1.0% to 5.0%.

The additive composition may be added to the cement, concrete, etc. at any suitable point in the preparation of the final cement composition and most preferably is added to the mix water used to form the cement composition or to the mix water-cement slurry. The additive should be admixed with the cement composition to evenly distribute the solutes therein.

The following Examples further illustrate the present invention. In the Examples, several different Type I Portland cements (labeled A through E) were used to assess the performance of the additive compositions. The compositions of cements A through E, in weight percent, were as shown in the following Table I:

TABLE I

| Portland Cement Composition | A | B | C | D | E |
|---|---|---|---|---|---|
| $SiO_2$ | 21.1 | 21.2 | 21.5 | 21.5 | 20.7 |
| $Al_2O_3$ | 4.6 | 4.7 | 4.4 | 4.5 | 5.2 |
| $Fe_2O_3$ | 2.0 | 3.1 | 3.9 | 4.2 | 2.9 |
| CaO | 65.1 | 66.0 | 64.7 | 62.2 | 63.0 |
| MgO | 2.5 | 1.3 | 1.2 | 3.1 | 2.2 |
| $SO_3$ | 2.8 | 2.6 | 2.7 | 2.6 | 3.1 |
| L.O.I. | 1.4 | 1.1 | 0.8 | 0.6 | 0.7 |
| $C_3S$ | 63 | 64 | 57 | 46 | 52 |
| $C_2S$ | 13 | 12 | 18 | 27 | 20 |
| $C_3A$ | 8 | 7 | 5 | 5 | 9 |
| $C_4AF$ | 6 | 9 | 12 | 13 | 11 |

Unless otherwise specified, all parts, percentages and concentrations specified in the Examples are by weight.

EXAMPLE 1

Concretes containing approximately 79% coarse aggregate and sand were prepared from cements A, B and C. An aqueous solution of this invention containing about 30% calcium nitrite and about 2.55% sodium heptogluconate, prepared by dissolving the respective solutes in water at room temperature, was admixed with each of the concretes to provide concentrations of calcium nitrite and sodium heptogluconate of about 2% and 0.17%, respectively, based on the weight of dry Portland cement. For comparison purposes, similar concretes were prepared with no admixture and with 2% calcium nitrite added. The properties which were observed in the resultant concretes are presented in Table II:

TABLE II

| Cement | Cement Factor (lbs/yd³) | Air (%) | Slump (in) | Setting Time (hr:min)* Initial | Final | Compressive Strength (PSI) 1-day | 7-day | 28-day | Admixture |
|---|---|---|---|---|---|---|---|---|---|
| A | 519 | 1.6 | 5 | 4:32 | 5:47 | 1416 | 3587 | 5459 | None |
| A | 515 | 2.0 | 3¾ | 2:45 | 3:39 | 1510 | 4632 | 6129 | 2% Ca(NO₂)₂ |
| A | 518 | 2.3 | 5 | 4:02 | 5:00 | 1614 | 5400 | 6644 | 2% Ca(NO₂)₂ 0.17% sodium heptogluconate |
| B | 515 | 1.3 | 5 | 5:33 | 6:59 | 1131 | 4073 | 5203 | None |
| B | 514 | 2.0 | 4 | 2:46 | 3:39 | 1575 | 5219 | 6351 | 2% Ca(NO₂)₂ |
| B | 518 | 2.4 | 3¾ | 4:22 | 5:25 | 1966 | 6237 | 7333 | 2% Ca(NO₂)₂ 0.17% sodium heptogluconate |
| C | 517 | 1.7 | 4¼ | 5:20 | 6:59 | 1024 | 4048 | 5599 | None |
| C | 518 | 2.1 | 4¾ | 2:56 | 3:57 | 1156 | 4467 | 5889 | 2% Ca(NO₂)₂ |
| C | 518 | 2.7 | 4¾ | 4:42 | 5:58 | 1158 | 4999 | 6433 | 2% Ca(NO₂)₂ 0.17% sodium heptogluconate |

*Measured in accordance with ASTM C403

The additive solution used in this Example was a clear, single phase solution which was substantially physically and chemically stable for an indefinitely long period of time and exhibited no loss of activity on storage.

EXAMPLE 2

Three solutions of this invention were prepared containing, respectively, about 1.27%, 1.69%, and 2.31% sodium heptogluconate and about 30% calcium nitrite. The solutions were prepared by dissolving the solutes in water at room temperature. The solutions were admixed with batches of a concrete prepared from cement D and containing about 79% of coarse and fine aggregate to provide a calcium nitrite concentration of about 2% and respective sodium glucoheptonate concentrations of about 0.085%, 0.113%, and 0.142%, based on the weight of dry Portland cement. For comparison purposes, similar concretes were prepared with no admixture and with 2% calcium nitrite added. The properties which were observed in the resultant concretes are presented in Table III:

TABLE III

| Cement | Cement Factor (lbs/yd³) | Air (%) | Slump (in) | Setting Time Initial | (Hr:Min)* Final | Admixture |
|---|---|---|---|---|---|---|
| D | 508 | 2.7 | 5 | 5:09 | 6:29 | None |
| D | 508 | 2.9 | 5 | 3:57 | 5:19 | 2% Ca(NO₂)₂ |
| D | 508 | 2.9 | 5 | 4:24 | 5:32 | 2% Ca(NO₂)₂ 0.085% sodium heptogluconate |
| D | 508 | 3.2 | 5 | 4:38 | 5:56 | 2% Ca(NO₂)₂ 0.113% sodium heptogluconate |
| D | 506 | 3.1 | 3 | 4:57 | 6:10 | 2% Ca(NO₂)₂ 0.142% sodium heptogluconate |

*Measured in accordance with ASTM C403

The solutions used in this Example were similar in appearance and stability to that of Example 1.

EXAMPLE 3

Concretes containing approximately 76% coarse and fine aggregate were prepared from cements A, C and E. An aqueous solution of this invention containing about 30% calcium nitrite and about 1.53% of corn syrup) blend C2-206, available from Staley Mfg. Co., Decatur, Ill.), prepared by dissolving the respective solutes in water at room temperature, was admixed with each of the concretes to provide concentrations of calcium nitrite and corn syrup of about 2% and 0.112%, respectively, based on the weight of dry Portland cement. For comparison purposes, similar concretes were prepared with no admixture and with 2% calcium nitrite added. The properties which were observed in the resultant concretes are presented in Table IV:

TABLE IV

| Cement | Cement Factor (lbs/yd$^3$) | Air (%) | Slump (in) | Setting Time (hr:min)* Initial | Setting Time (hr:min)* Final | Compressive Strength (PSI) 1-day | Compressive Strength (PSI) 21-day | Admixture |
|---|---|---|---|---|---|---|---|---|
| C | 630 | 6.0 | 4¾ | 4:55 | 6:20 | 1221 | 4544 | None |
| C | 625 | 6.3 | 4¼ | 2:22 | 3:09 | 1452 | 4623 | 2% Ca(NO$_2$)$_2$ |
| C | 619 | 7.2 | 4 | 4:24 | 5:31 | 1483 | 5034 | 2% Ca(NO$_2$)$_2$ 0.112% corn syrup |
| A | 633 | 6.0 | 6¼ | 4:08 | 5:10 | 1559 | 3597 | None |
| A | 649 | 4.6 | 3 | 2:10 | 2:54 | 3045 | 6738 | 2% Ca(NO$_2$)$_2$ |
| A | 654 | 4.3 | 3¾ | 4:29 | 5:26 | 3532 | 7063 | 2% Ca(NO$_2$)$_2$ 0.112% corn syrup |
| E | 652 | 3.8 | 3¾ | 3:57 | 4:25 | 2863 | 6643** | None |
| E | 656 | 3.3 | 2 | 1:59 | 2:43 | 3551 | 8378** | 2% Ca(NO$_2$)$_2$ |
| E | 655 | 3.8 | 2 | 3.45 | 4.37 | 3492 | 7989** | 2% Ca(NO$_2$)$_2$ 0.112% corn syrup |

*Measured in accordance with ASTM C403
**One year compressive strength

The solution used in this Example was slightly darker in color than those of Examples 1 and 2 but was otherwise similar in appearance and stability.

EXAMPLE 4

Two solutions of this invention were prepared containing, respectively, about 1.77% and 2.22% sodium gluconate and about 30% calcium nitrite. The solutions were prepared by dissolving the solutes in water at room temperature. The solutions were admixed with batches of a concrete prepared from cement C and containing about 79% of coarse and fine aggregate to provide a calcium nitrite concentration of about 2% and respective sodium gluconate concentrations of about 0.118% and 0.148%, based on the weight of dry Portland cement. For comparison, similar concretes were prepared with no admixture and with 2% calcium nitrite added. The properties which were observed in the resultant concretes are presented in Table V:

TABLE V

| Cement | Cement Factor (lbs/yd$^3$) | Air (%) | Slump (in) | Setting Time (Hr:Min)* Initial | Setting Time (Hr:Min)* Final | Compressive Strength (PSI) 1-day | Compressive Strength (PSI) 7-day | Admixture |
|---|---|---|---|---|---|---|---|---|
| C | 521 | 1.8 | 1½ | 5:12 | 7:00 | 1376 | 4205 | None |
| C | 521 | 2.2 | 1½ | 2:27 | 3:23 | 1757 | 4866 | 2% Ca(NO$_2$)$_2$ |
| C | 521 | 2.1 | 2¼ | 3:34 | 4:36 | 1645 | 4991 | 2% Ca(NO$_2$)$_2$ 0.118% sodium gluconate |
| C | 523 | 2.0 | 1¾ | 4:20 | 5:38 | 1811 | 5353 | 2% Ca(NO$_2$)$_2$ 0.148% sodium gluconate |

*Measured in accordance with ASTM C403

The solutions used in this Example were similar in appearance and stability to those of Examples 1 and 2.

The results presented in Tables II–V show substantial offsetting by the set retarder of the set acceleration of the calcium nitrite and, moreover, indicate that, in general, significant increases in compressive strength are obtained by use of the additives of this invention.

EXAMPLE 5

An aqueous solution of this invention was prepared containing about 30% calcium nitrite and about 2.55% sodium heptogluconate dissolved in water. The solution was allowed to stand at room temperature for 37 days. At the end of that time, there was no visual evidence of decomposition, i.e., no gassing, precipitation, change in color, or other evidence of physical or chemical degradation or change. The solution was then added to a concrete prepared from cement C and its effect on compressive strength was compared to that obtained using no calcium nitrite or heptogluconate additives and that obtained by adding equivalent amounts of calcium nitrite and sodium heptogluconate separately to the concrete. All three sample concretes were air entrained by adding between 0.006 and 0.012% of DAREX AEA ®, a sulfonated hydrocarbon air entraining agent commercially available from W. R. Grace & Co., Cambridge, Massachusetts. The varying amounts of DAREX AEA ® were employed in this and the following Example in an attempt to entrain the same amount of air in all the concrete samples. The compressive strength data is presented in Table VI. The premixed calcium nitrite-sodium heptogluconate unexpectedly appeared to increase the compressive strength of the concrete:

TABLE VI

| Cement | Factor (lbs/yd$^3$) | Air (%) | Slump (in) | Compressive Strength (PSI) 1-day | Compressive Strength (PSI) 21-day | Admixture |
|---|---|---|---|---|---|---|
| C | 631 | 5.8 | 4¼ | 1150 | 3955 | 0.012% AEA |
| C | 636 | 6.0 | 3¼ | 1739 | 5827 | 0.006% AEA; 2% Ca(NO$_2$)$_2$ and 0.17% sodium heptogluconate added separately |
| C | 640 | 7.0 | 2¾ | 1923 | 6399 | 0.010% AEA; 2% Ca(NO$_2$)$_2$ and 0.17% sodium heptogluconate |

TABLE VI-continued

| Cement | Cement Factor (lbs/yd³) | Air (%) | Slump (in) | Compressive Strength (PSI) 1-day | 21-day | Admixture |
|---|---|---|---|---|---|---|
| | | | | | | (37 day solution) |

EXAMPLE 6

Calcium nitrite and sodium lignosulfonate (a well known set retarder) were combined in water in sufficient amount to provide concentrations of 30% and 3.75%, respectively. The mixture was allowed to stand at room temperature for 37 days. At the end of that time, there was visual evidence of the mixture undergoing decomposition, i.e., oxides of nitrogen were being evolved and an insoluble sludge was precipitating. The mixture was then added to a concrete prepared from cement C and its effect on compressive strength was compared to that obtained using no calcium nitrite or sodium lignosulfonate and that obtained by adding equivalent amounts of calcium nitrite and sodium lignosulfonate separately. All three sample concretes were air entrained using 0.006% to 0.014% DAREX AEA ®. The compressive strength data is presented in TABLE VII. While the aged mixture had no effect on the 1-day strength, a significant reduction in 21-day strength was measured:

TABLE VII

| Cement | Cement Factor (lbs/yd³) | Air (%) | Slump (in) | Compressive Strength (PSI) 1-day | 21-day | Admixture |
|---|---|---|---|---|---|---|
| C | 644 | 5.7 | 3¼ | 1188 | 5050 | 0.014% AEA |
| C | 649 | 4.7 | 2¼ | 2017 | 7277 | 0.006% AEA; 2% Ca(NO₂)₂ and 0.25% sodium lignosulfonate added separately |
| C | 641 | 6.8 | 2¼ | 2024 | 6868 | 0.007% AEA; 2% Ca(NO₂)₂ and 0.25% sodium lignosulfonate (mixture aged 37 days) |

What is claimed is:

1. As a composition, an aqueous solution which can be used as a corrosion inhibiting additive for Portland cement compositions, said solution consisting essentially of water and, as solutes, a major proportion by weight of calcium nitrite and a minor proportion by weight of corn syrup, a hydroxycarboxylic acid, or an alkali metal or alkaline earth metal salt of a hydroxycarboxylic acid.

2. An additive of claim 1 wherein the concentration of calcium nitrite is in the range of about 10% to 40% on a weight basis.

3. An additive of claim 2 wherein the concentration of calcium nitrite is in the range of about 25% to 35% on a weight basis.

4. An additive of claim 1 wherein the weight ratio of calcium nitrite to said corn syrup, hydroxycarboxylic acid, or alkali metal or alkaline earth metal salt of a hydroxycarboxylic acid is in the range of about 50:1 to 5:1.

5. An additive of claim 1 wherein said hydroxycarboxylic acid is a glyconic acid conforming to the formula

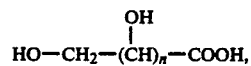

wherein n is 0 to 10, inclusive of all isomeric configurations.

6. An additive of claim 5 wherein said alkali metal salt of a hydroxycarboxylic acid is a sodium salt of said glyconic acid.

7. An additive of claim 6 wherein said sodium salt is sodium gluconate or sodium heptogluconate.

8. An additive of claim 5 wherein said alkaline earth metal salt of a hydroxycarboxylic acid is a calcium salt of said glyconic acid.

9. A method for inhibiting the corrosion of metals in contact with a Portland cement composition, said method comprising admixing with said cement composition an effective amount of an aqueous solution consisting essentially of water and, as solutes, a major proportion by weight of calcium nitrite and a minor proportion by weight of a set retarder selected from the group consisting of corn syrup, a hydroxycarboxylic acid, or an alkali metal or alkaline earth metal salt of a hydroxycarboxylic acid.

10. A method of claim 9 wherein said additive is admixed with said cement composition in sufficient amount to provide a weight concentration of said calcium nitrite in the range of about 0.5% to 10.0%, based on the weight of dry Portland cement.

11. A method of claim 10 wherein said range is about 1.0% to 5.0%.

12. A method of claim 9 wherein the weight ratio in said solution of calcium nitrite to said set retarder is in the range of about 50:1 to 5:1.

* * * * *